United States Patent
Agrawal et al.

(10) Patent No.: US 6,870,090 B2
(45) Date of Patent: Mar. 22, 2005

(54) SYSTEM FOR PROTECTING AGAINST LEAKAGE OF SENSITIVE INFORMATION FROM COMPROMISING ELECTROMAGNETIC EMISSIONS FROM COMPUTING SYSTEMS

(75) Inventors: Dakshi Agrawal, Yorktow Heights, NY (US); Bruce Roy Archambeault, Four Oaks, NC (US); Josyula R. Rao, Briarcliff Manor, NY (US); Pankaj Rohatgi, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 10/109,819

(22) Filed: Mar. 28, 2002

(65) Prior Publication Data

US 2003/0081400 A1 May 1, 2003

Related U.S. Application Data

(60) Provisional application No. 60/335,472, filed on Nov. 1, 2001.

(51) Int. Cl.[7] .............................................. H05K 9/00
(52) U.S. Cl. ..................... 174/35 R; 702/191
(58) Field of Search .................... 174/35 R, 35 GC; 361/84–87, 118, 119, 799, 800, 816, 818; 343/872, 909; 702/190, 191

(56) References Cited

U.S. PATENT DOCUMENTS

| | | | |
|---|---|---|---|
| 5,633,786 A | * 5/1997 | Matuszewski et al. | ...... 361/818 |
| 5,784,241 A | * 7/1998 | Munch et al. | .............. 361/111 |
| 5,981,043 A | * 11/1999 | Murakami et al. | .......... 428/209 |
| 6,136,131 A | * 10/2000 | Sosnowski | .................. 156/256 |

* cited by examiner

Primary Examiner—Dean A. Reichard
Assistant Examiner—Carmelo Oliva
(74) Attorney, Agent, or Firm—Louis J. Percello; Harrington & Smith, LLP

(57) ABSTRACT

An electronic device for distorting sensitive information in one or more electromagnetic emanations from the electronic device is disclosed. The device has one or more active layers having one or more electronic components that emit the electromagnetic emanations and one or more conductive substrate layers planarity adjacent to one or more of the active layers that distort the electromagnetic emanations. In alternative embodiments of the inventions, shielding is added with frequency selective openings. In other alternative embodiments, a signal source is added to distort sensitive information.

24 Claims, 13 Drawing Sheets

SYSTEM FOR PROTECTING AGAINST LEAKAGE OF SENSITIVE INFORMATION FROM COMPROMISING ELECTROMAGNETIC EMISSIONS FROM COMPUTING SYSTEMS

CLAIM OF PRIORITY

This invention claims priority to U.S. Provisional patent application No. 60/335,472, entitled "An Evaluation Procedure for Testing Electromagnetic Emanation Vulnerabilities of Computing Systems and Countermeasures for Addressing Leakages of Sensitive Information from Compromising Electromagnetic Emanations" to Agrawal et al., filed on Nov. 1, 2001 which is herein incorporated by reference in its entirety.

RELATED APPLICATIONS

This application relates to: U.S. patent application Ser. No. 10/109,836, entitled "A System And Method For Evaluating Electromagnetic Emanation Vulnerabilities Of Computing Systems" to Agrawal et al., filed on Mar. 28, 2002, the contents of which are incorporated by reference herein; and U.S. patent application Ser. No. 10/109,297, entitled "A System And Method Protecting Against Leakage Of Sensitive Information From Compromising Electromagnetic Emanations From Computing Systems" to Archambeault et al., filed on Mar. 27, 2002, the contents of which are incorporated by reference herein.

FIELD OF THE INVENTION

This invention relates to the field of security for devices such as computing devices and their peripherals. More specifically, the invention relates to protecting against leakage of sensitive information from compromising electromagnetic emanations from computing systems using hardware countermeasures.

BACKGROUND OF THE INVENTION

The field of information security deals with methods and mechanisms to protect sensitive information. Some of these methods and mechanisms deal with the problem of maintaining the integrity of information while it is in storage or in transit, others deal with the issue of ensuring that the information is available only to authorized entities and access is denied to entities that are not authorized. Over the years, a number of different techniques and mechanisms have been developed and implemented to achieve these goals.

It is well known that computing devices and their peripherals such as displays, keyboards and printers (hereafter referred to as computer equipment) emit electromagnetic radiation consisting of electrical and magnetic fields when they are used. This has mostly been viewed as a nuisance since it can adversely affect the functioning of other electrical/electronic equipment in the same geographical vicinity. In fact, there are a number of international laws that have been passed by various countries (including USA, Canada, EU, France and Japan) that limit the amount of electromagnetic emanations from computing equipment and that also specify the amount of emanation that such equipment should be able to tolerate while still functioning correctly. It is fairly standard for all computing equipment to be tagged with a note about its compliance with international regulations on the amount of electromagnetic emanations.

Although it is known that data being presented or sent to a peripheral device can be reconstructed to some extent using the electromagnetic emanations, the extent and nature of information leakage from a computing equipment about the state of the computing equipment and function being performed on the equipment is not known. This is true even for the state and functions being performed by ancillary processors such as those embedded in computer peripherals. This is especially a source of great concern when computations are dealing with sensitive information and security critical data. Using information from electromagnetic emanations, an adversary may gain complete knowledge of a targeted computing equipment. The techniques and technology for protecting against such attacks are also not known. Furthermore, there are no guidelines or standards for securing computing equipment that provide protection from such attacks. As a consequence, most computing equipment sold commercially, even those advertised to be secure, are highly insecure in practice due to leakage of sensitive information through electromagnetic emanations.

Recently, a small amount of information on EM vulnerability and analysis has been declassified by the US government (see the NSA Tempest series at http://cryptome.org/nsa-tempest.htm). Even so, this provides no information on how one can assemble the equipment to monitor, collect, and aggregate such emanations, how one can analyze these emanations to extract the sensitive information, and finally and most importantly, how one can design equipment, at both the hardware and the software level to prevent the leakage of sensitive information from computing equipment. Thus, there is no known way of assessing the nature and extent of information leakage via electromagnetic emanations and no known way of protecting against this information leakage.

Many mechanisms and countermeasures are known in prior art that have been proposed to reduce the electromagnetic emanations in some constrained information processing devices. These fall into two main categories. In the first category are the physical protection methods which try to reduce the amount of emanations from the device itself, e.g., the use of physical shielding and hardware design which minimize the emanations. Use of these techniques results in computing equipment which inherently leaks less emanations than the equipment which is not thus protected, however the emanations are not entirely eliminated. The critical aspect missed by all these mechanisms is that a reduction in the strength of electromagnetic emanations does not translate directly to a corresponding reduction in the amount of information leakage within the remaining emanations. Thus, in most situations, even after the application of these physical protections, there is enough information content in the remaining emanations to render computing equipment susceptible to security attacks. To overcome this problem, there is a second category of protection mechanisms that are based on reducing the effectiveness of the information that leaks in emanations despite physical shielding. These techniques attempt to artificially change the emanations by the addition of other electromagnetic signals to mask and hide the original emanations from the equipment.

The protection methods described above suffer from many serious drawbacks: they cannot quantify how much information about the state and functioning of computing equipment is still contained in remaining electromagnetic emanations. Furthermore, the primary focus of these protection methods is not to reduce sensitive information contained in emanations but rather to reduce the emanations themselves or to add other emanations. The methods which focus on reducing emanations by physical shielding can be rendered significantly less effective, for example, by using more powerful sensors, better positioned sensors, etc., thus providing sensitive information. Similarly, protection methods which focus on adding other emanations can be compromised in a variety of ways, such as additional signal processing, using more samples, physically removing sources of extra emanations, etc.

Therefore, it would be advantageous to be able to design hardware countermeasures that are based on reducing overall information leakage as opposed to countermeasures that only reduce emanations and countermeasures that only rely on extra emanations.

SUMMARY OF THE INVENTION

An aspect of this invention is to provide improved hardware countermeasures.

Another aspect of this invention is to provide hardware countermeasures that take into account the sensitive information present in emanations when the computing equipment is executing a function in different states with different data.

Another aspect of this invention is to provide equipment designers and equipment manufacturers the ability to redesign their systems to minimize some of the more serious electromagnetic leakages and develop workarounds to reduce the security exposures from the less serious electromagnetic leakages.

The present invention is an electronic device for distorting sensitive information in one or more electromagnetic emanations from the electronic device. The device has one or more active layers having one or more electronic components that emit the electromagnetic emanations and one or more conductive substrate layers planarity adjacent to one or more of the active layers that distort the electromagnetic emanations. In alternative embodiments of the inventions, shielding is added with frequency selective openings. In other alternative embodiments, a signal source is added to distort sensitive information.

DETAILED DESCRIPTION OF THE INVENTION

Figure 1:
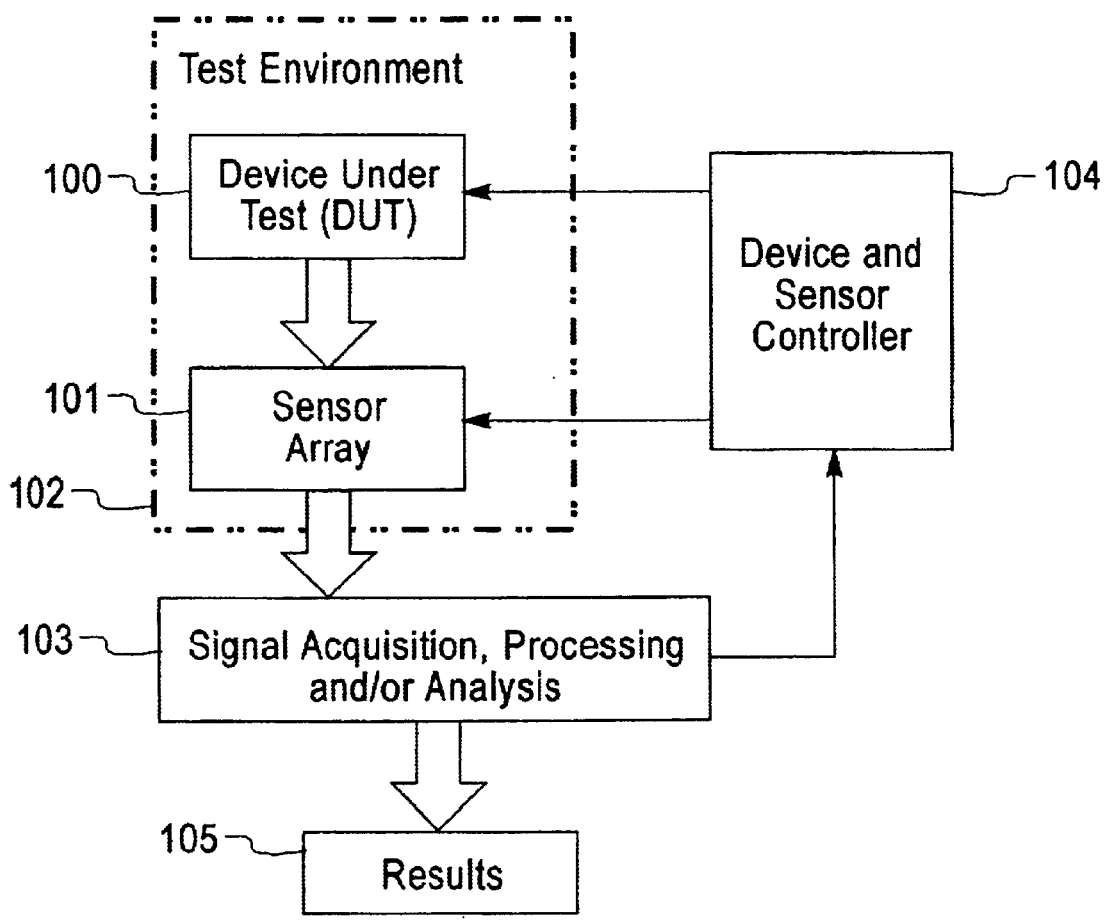
FIG. 1 is a block diagram of an experimental setup required to acquire, process and analyze electromagnetic emanations from various devices.

This invention is primarily described in FIGS. 11–13 below. Additional information related to the invention is provided in FIGS. 1–10. Other related inventions are more fully described and claimed in the above-referenced U.S. patent application Ser. No. 10/109,836, entitled "A SYSTEM AND METHOD FOR EVALUATING ELECTROMAGNETIC EMANATION VULNERABILITIES OF COMPUTING SYSTEMS" to Agrawal et al. and U.S. patent application Ser. No. 10/109,297, entitled "A SYSTEM AND METHOD PROTECTING AGAINST LEAKAGE OF SENSITIVE INFORMATION FROM COMPROMISING ELECTROMAGNETIC EMANATIONS FROM COMPUTING SYSTEMS" to Archambeault et al. These applications were filed on the same day as this patent application and are herein incorporated by reference in their entirety.

This disclosure provides (a) a systematic and rigorous evaluation methodology for testing computing equipment for leakages of sensitive information via electromagnetic emanations and (b) design rules, heuristics and programming techniques that minimize the leakage of such information.

Assembly of the equipment begins with the device under test, hereinafter abbreviated DUT. It should be made clear that the present invention applies to all sorts of computing equipment and peripherals including all types of computer processors, monitors, keyboards, secure cards and printers etc. All these devices generate electromagnetic emanations while performing their designated functions, in one form or another. These signals carry information about the function being performed by the DUT and its state.

It is important to understand the mechanisms by which this latter information leakage occurs. Each of the aforementioned devices consists of several electrical elements such as transistors, gates, bus lines, etc. laid out in a defined geometry on a chip surface according to the intentions of a chip designer. Typically, these elements are activated by a power source and driven by a clock source including but not restricted to crystal oscillators and pulse generators. These clock sources generate emanations at and around the clock frequency and its harmonics. Henceforth, these emanations will be called carrier signals. When the device under test performs its designated functions, there are time-varying changes in the electrical state of its circuits. Any signal which provides information about this activity is hereinafter called the message signal. This electrical activity may result in electromagnetic signals being emitted directly. Such emanations will hereinafter be referred to as direct emanations. It also possible for these message signals to modulate the carrier signals present within and/or being emitted by the device. It is possible for the same carrier signal to be modulated in different ways including but not restricted to amplitude modulation, frequency modulation and phase modulation etc. Hereafter, we will refer to the modulated carrier signal as the modulated signal.

At this stage, it is important to point out that the modulated signal can be emitted by the DUT in several ways including conductive emanations, radiative emanations etc. Conductive emanations refers to the leakage of modulated signals via electrically conducting channels that are attached to the DUT. For instance, for a computing equipment which uses the AC mains as a power source, the ground line is a good conductive emanation channel. Radiative emanations refers to the leakage of the modulated signal into the medium (such as air or vacuum) that surrounds the DUT. Such emanations can be observed by placing antennas in the vicinity of the device (both the near field and the far field), which are not in direct contact with the device.

It is by monitoring and collecting emanations such as the conductive and radiative emanations etc., and then processing and analyzing them, that one can gain more information about the function being performed and the state of the DUT.

To elucidate this further, we describe the methodology in three phases: equipment setup, collection methodology and analysis methodology. FIG. 1 illustrates our methodology in a block diagram format. The DUT is shown as 100. An array of sensors depicted as 101 is used to pick up the emanations from the DUT. Both the DUT 100 and the sensors 101 are placed in a test environment 102. This test environment can be in the clear. In some situations it may be advantageous to shield the test environment using apparatus such as a shielded enclosure, an anechoic chamber, a Faraday cage etc. The output of the sensors is processed by a signal acquisition, processing and/or analysis module 103. As the name indicates, the main function of this module is to acquire the emanations, process them and analyze them for information about functions being performed by the DUT. This module also provides feedback that can be used to control the equipment setup. This feedback is passed to a device and sensor controller 104 which in turn controls the DUT 100 and the sensors 101. The results 105 are then presented to the user.

It should be noted that various elements comprising the acquisition, processing and/or analysis module and the device and sensor controller module can be realized in either one of several ways: hardware, software or firmware. The present invention may be realized with any one of these ways.

We now provide more detail of each of the modules 101 and 103.

The first step in collecting electromagnetic equipment is to assemble the equipment to collect the emanations. A first choice to be made is that of sensors used to monitor the emanations. While it is possible to determine a priori, a range of frequencies for the emanations, a complete approach requires one to collect signals over the complete electromagnetic spectrum. Knowledge of the specifics of the device, such as the clock frequency and the ambient carrier frequencies can help one focus on a particular band of frequencies in the electromagnetic spectrum and find modulated signals. The present invention may collect several types of emanations including conductive, radiative emanations etc. It should be clear to those with ordinary skill in the art that more accurate results about the overall information leakage may be obtained when a broader class of emanations are collected and analyzed. These emanations may be collected using different types of sensors. Even within a single class of emanations, one can use a variety of different sensors to gather different emanations for different parts of the electromagnetic spectrum. The choice of sensors can be further dictated by several factors such as the carrier frequencies and harmonics that are being emitted by the equipment under test, the signal to noise ratio of the emitted carriers, the proximity of the antenna to the equipment under test, the gain-bandwidth product of the antenna and the desired level of accuracy of the results vis a vis the errors introduced in the measurement process etc.

Figure 2:
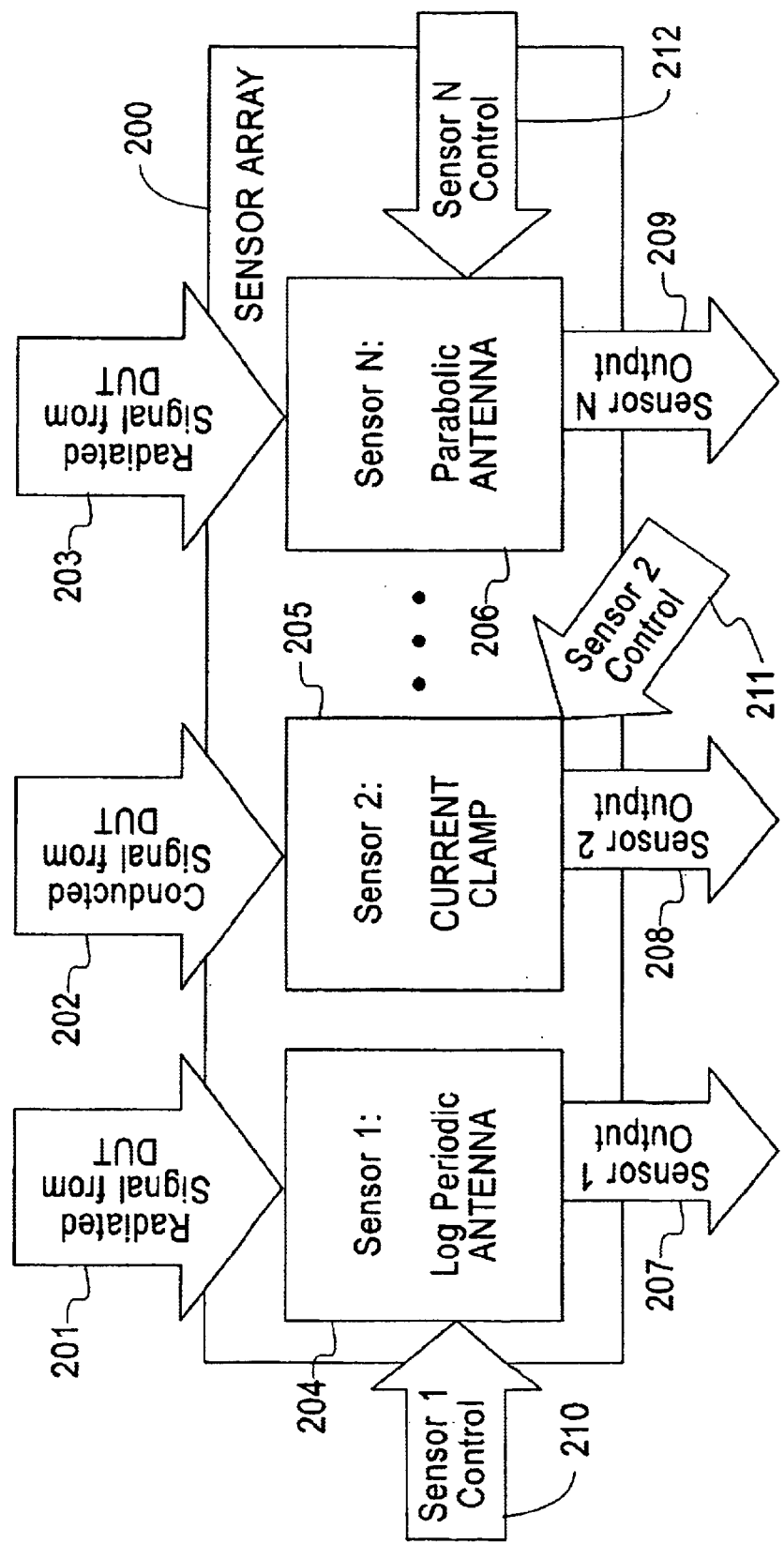
FIG. 2 is a block diagram of a detail of a sensor array.

In FIG. 2, we show further details of the sensor array 200. FIG. 2 is presented only as an example of how emanations are acquired. There are many well known methods and apparatus for doing this.

Inputs to the sensor array are a range of emanations from the DUT 201, 202 and 203. These may be acquired using different sorts of sensors. For instance, a log periodic antenna 204 can be used for acquiring some radiative emanations, a current clamp 205 for acquiring some other conductive emanations and a parabolic antenna 206 for collecting some other radiative emanations in a directional manner. For some other conductive emanations, the ground conductor of the power line may be used for computing equipment. For some other radiative emanations, a simple antenna made from a metal such as gold, silver or copper, a directional sensor such a horn antenna, or a biconical antenna may be used. Note that there a number of different antennas and sensors that qualify for this task and the examples here just illustrate some of the numerous choices that can made. Each of the sensors is configured, set and controlled using a sensory control 210, 211 and 212 respectively. These controls can be used to set the various parameters of the sensors such as center frequency, bandwidth, gain etc. The outputs of the sensors 207, 208 and 209 are then fed to the signal acquisition, processing and/or analysis module.

Figure 3:
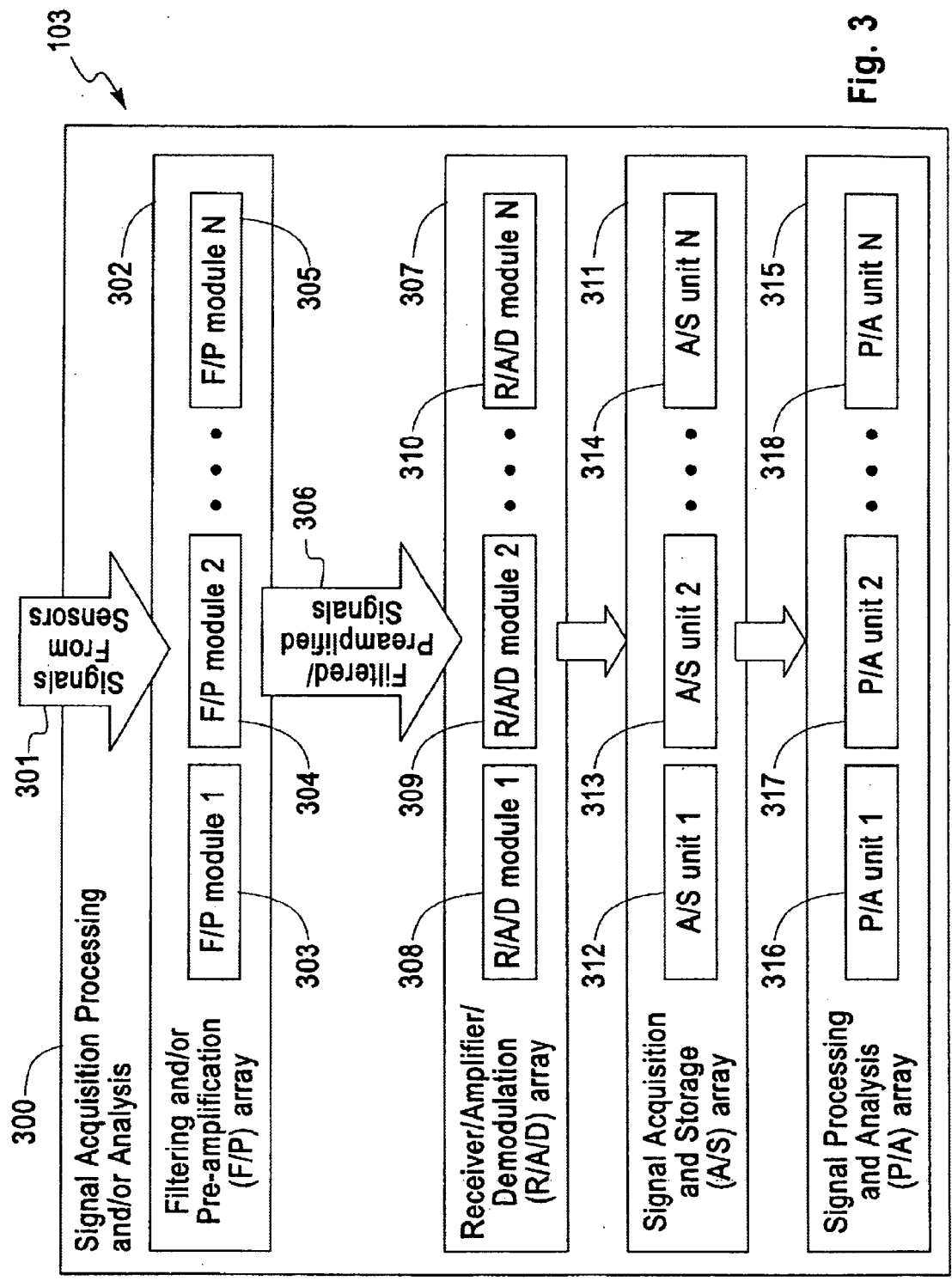
FIG. 3 is a block diagram of a system architecture showing an information flow of signal acquisition, processing, and analysis.

Details of the Signal Acquisition, Processing and/or Analysis Module 300 are given in FIG. 3. The module consists of four stages. In the first stage, the emanations acquired from the Sensor Array 301 are fed to the Filtering and Pre-Amplification Array 302 consisting of several modules 303, 304 and 305. The purpose of this stage is multifold: to extract selected frequency bands of interest from the emanations, to eliminate noise, and to amplify the signals so as to improve the signal to noise ratio in the region of interest.

The filtered and amplified signals 306 are fed to the Receiver/Amplifier/Demodulator array. The purpose of this stage is to take the filtered and pre-amplified signals and extract the message signal from the emanations. This stage can be accomplished by a variety of modules 308, 309 and 310 as shown. The techniques used for demodulation include but are not limited to amplitude demodulation, frequency demodulation and phase demodulation. Direct emanations may not require demodulation. Yet another instance of extraction of the message signal is to reconstruct the z-axis component from the modulated signal. This signal is then passed to the next stage.

The reconstructed message signals are then passed to a signal acquisition and storage array 311. The purpose of this unit is to sample the signals and store them in units such as 312, 313 and 314. Examples of such units include but are not limited to digital sampling cards which sample an analog signal at a certain frequency and then store the sample in a digital form etc. Hereafter, we shall call these the message samples.

The last stage of the process feeds the message samples to a signal processing and/or analysis array 315. Such an array is comprised of several processing/analysis units 316, 317 and 318 whose function is to process multiple signals. This processing can be done in a variety of ways. For instance, a unit can filter the signals further, remove noise, average them, take their Fourier transform, perform a wavelet analysis of them, perform cross correlations etc. All these operations are directed towards the goal of extracting the maximum possible information about the function being performed by the DUT and its state from the message samples that have been collected. The rest of the invention further describes a collection and analysis methodology for collecting and analyzing message samples.

Figure 4:
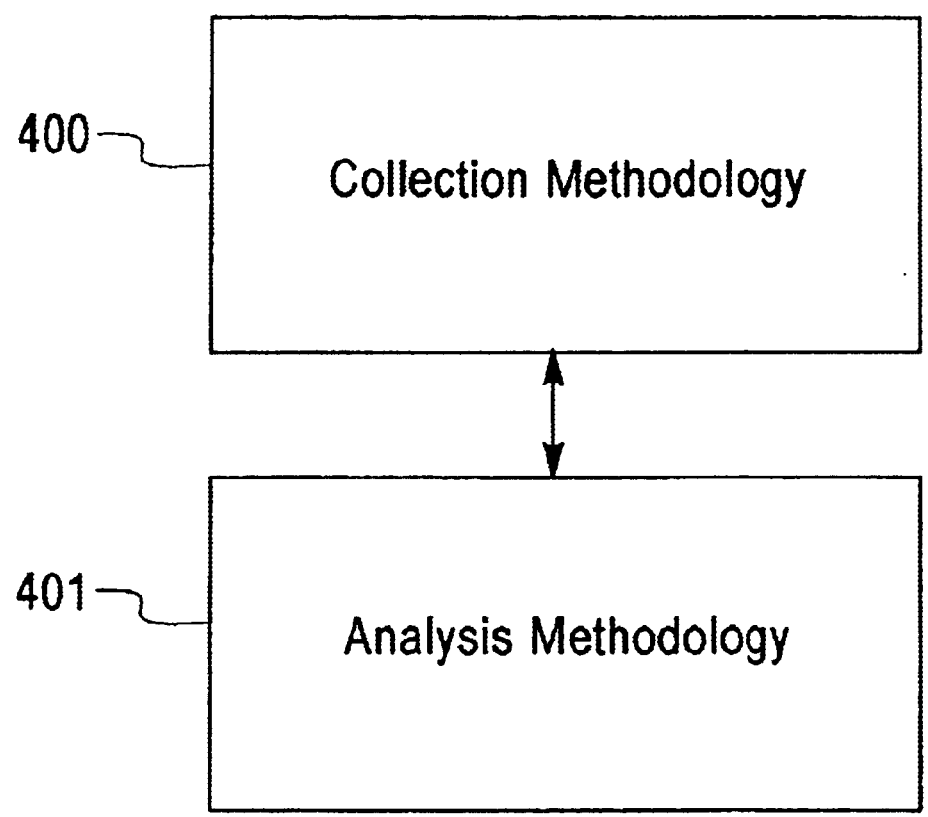
FIG. 4 is a flow chart showing collection and analysis processes.

The following describes the use of the apparatus outlined above for testing a device for its vulnerabilities. The process is a two step one: as shown in FIG. 4, the first step is to collect the message samples and the second step is to analyze them. Next, we shall provide more details of each of the steps.

Figure 5:
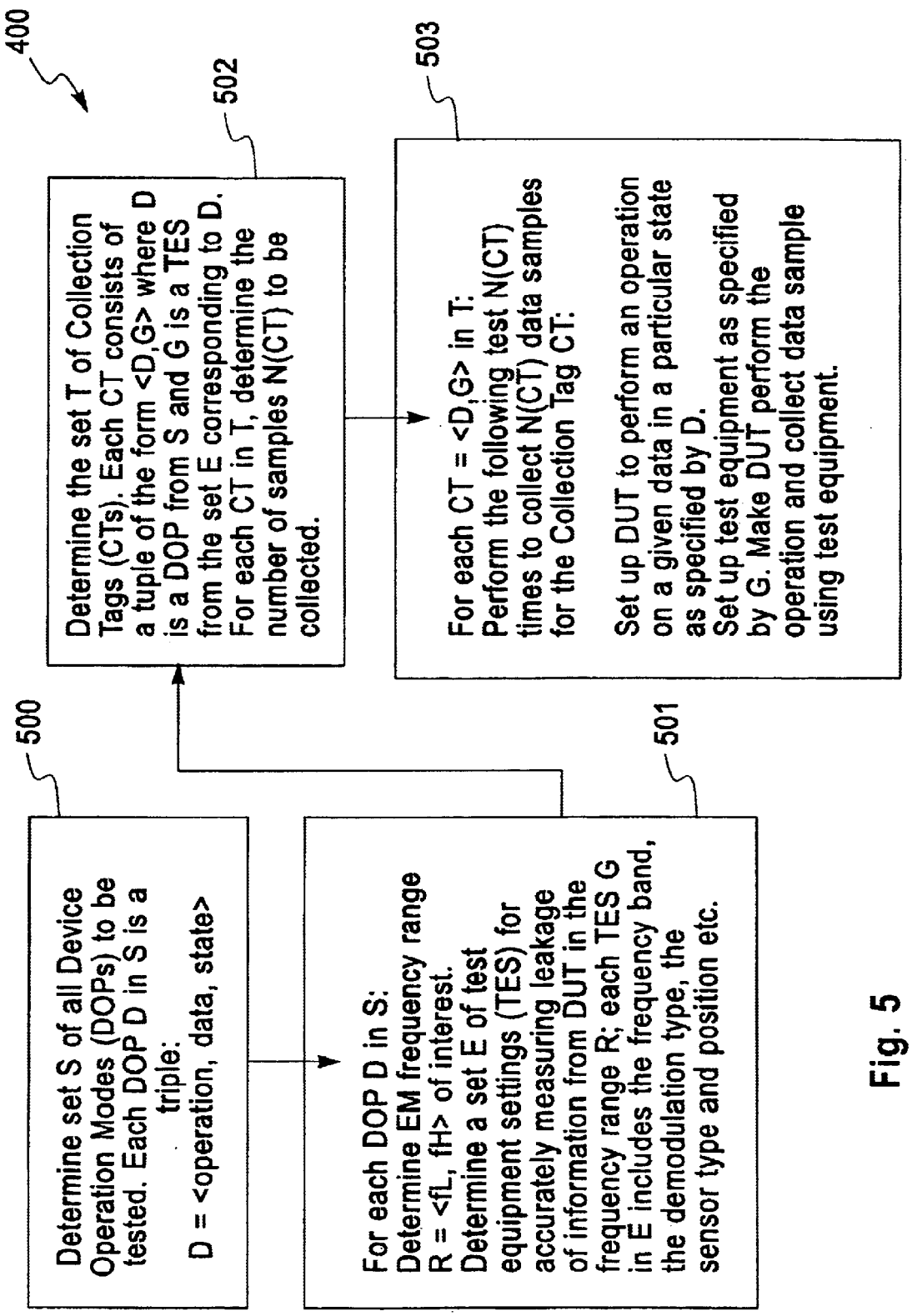
FIG. 5 is a flow chart of the Collection process.

Details of the collection methodology are shown in FIG. 5. The collection methodology begins with a determination 500 of which functions of the DUT need to be tested for leakage of information via electromagnetic emanations. This could differ depending on the situation. For instance, for a computer processor, this could be a few suspect instructions on some data or it could be the entire instruction set for all possible data. Then again, the leakages may differ depending on when and in what state of the DUT the suspect instruction is executed on the given data. To deal with this situation, the concept of a Device Operation Mode, hereinafter abbreviated as DOP, is introduced. A DOP is a 3-tuple consisting of <function, data, state>. The first entry refers to the function of the DUT that is to be tested. The second entry refers to the data on which said function operates. The third entry refers to the state of DUT in which said function is tested on said data. As has been pointed out earlier, it is not necessary for all functions to be tested on all the data on all possible states of the DUT. In many cases, it is possible to highlight a few suspect instructions which need to be tested on a few classes of data. Further, this need only be done in a few states of the DUT. In the preferred embodiment of this invention, there is a feedback provided by Signal Processing and Analysis Units (316, 317, and 318 in FIG. 3) to step 500 of FIG. 5. This feedback may be used by the step 500 to further refine the choice of relevant DOPs. One can make a collection of DOPs that are considered suspect to electromagnetic emanations for a given DUT: hereinafter, we refer to this collection of relevant DOPs as S.

Once a determination of the set S of DOPs has been made, the next step 501 is to determine appropriate sensors for monitoring the DUT while it is executing a DOP from set S. The first step in the process is to determine a range of frequencies, <fL, fH>, in which the information leakage lies. One way of doing this is to look at the spectral density of the emanations on a spectrum analyzer and delimit the lower and upper limit of the range of frequencies as fL and fH respectively which effectively bound the signal frequencies. Once the range of frequencies has been determined, the next step is to select a set of sensors appropriate for this range of frequencies. As described above, different sensors would be used for monitoring conductive emanations as opposed to radiative emanations. Even for a single class of emanations, one could use a range of different sensors based on a number of different factors such as the frequency response of the sensor, its gain-bandwidth product, its placement relative to the DUT, its proximity to the device etc.

Once the components of the sensor array 200 have been determined, the next step is to determine settings for the components for signal acquisition, processing and/or analysis. This module, as illustrated in FIG. 3 and described above, consists of 4 arrays comprising filtering and pre-amplification modules, receiver/amplifier/demodulation modules, signal acquisition and storage modules and finally signal processing and/or analysis modules. In this step, one determines settings for each of the modules of each of the arrays. For instance, one could select the frequencies that need to be filtered out and those that need to be amplified in the first stage, the mechanism and settings for demodulating the modulated signal and extracting the message signal in the second stage (such as amplitude demodulation, frequency demodulation and phase demodulation), the sampling frequency and the resolution of the samples, the number of points in a sample and number of samples in the third stage, issues such as the parameters for processing the samples such as the number of samples to be used for alignment and averaging, the resolution of the discrete fourier transform of the samples etc. Hereinafter, this will be called a test equipment setting, abbreviated as TES, and refer to the set of all possible test equipment settings hereinafter as E. The aim of this step is to essentially determine the set E for each DOP in set S that needs to be tested for vulnerabilities to electromagnetic emanations. Note that the signals can be derived by using equipment such as an RF filter, a preamplifier, an intermediate frequency mixer, a filter, an amplifier, a demodulator, a transform, a frequency domain transform, a fourier transform, a Laplace transform, a clipper and a z-axis transform. The derived signals, acquired using a given setting for the collection equipment may then be further processed by aligning two or more of them with one another using one or more prominent features and then averaging them.

Once the set S of DOPs and the set E of TES are known, the next step 502, is to determine the number of samples to be collected using the TES G from E, when the DUT is executing the DOP D from set S. Hereinafter, the pair <D, G> will be referred to as a collection tag (CT). Thus each collection tag CT, identifies the function, data and the state of the DUT to be tested and the test equipment setting under which the samples of the electromagnetic emanations from the DUT are collected. This step may also determine the number of samples, hereinafter denoted N(CT), of the electromagnetic emanations to be collected for each collection tag. In the preferred embodiment of this invention, the number of samples are decided by the feedback provided by the analysis in step 420.

The final step 503 is to actually collect the samples. The first part of the collection tag, the DOP, is used to determine the function, data and state of the DUT to be tested. The state of the DUT is configured to be the state specified in the DOP. This configuration can be facilitated by an input generator that provides a plurality of known inputs sequentially to one or more inputs of the DUT. The second part of the collection tag, the TES, is used to determine the settings of the test equipment. Once this has been accomplished, the DUT is activated so as to perform the function specified in the DOP on the data specified in the DOP. As a result of executing the function specified in the DOP, the DUT emits various signals which are collected by the aforementioned sensor array. This set of signals is passed through Signal Acquisition, Processing and/or Analysis Unit as described in FIG. 3 and the resulting message signals are stored. This process is repeated N(CT) times to yield the required number of message samples.

The assessment methodology consists of two parts: in the first part, relevant statistics about the message samples are determined, and in the second part these statistics are used to determine information leakage relating to a given set of predicates.

Figure 6:
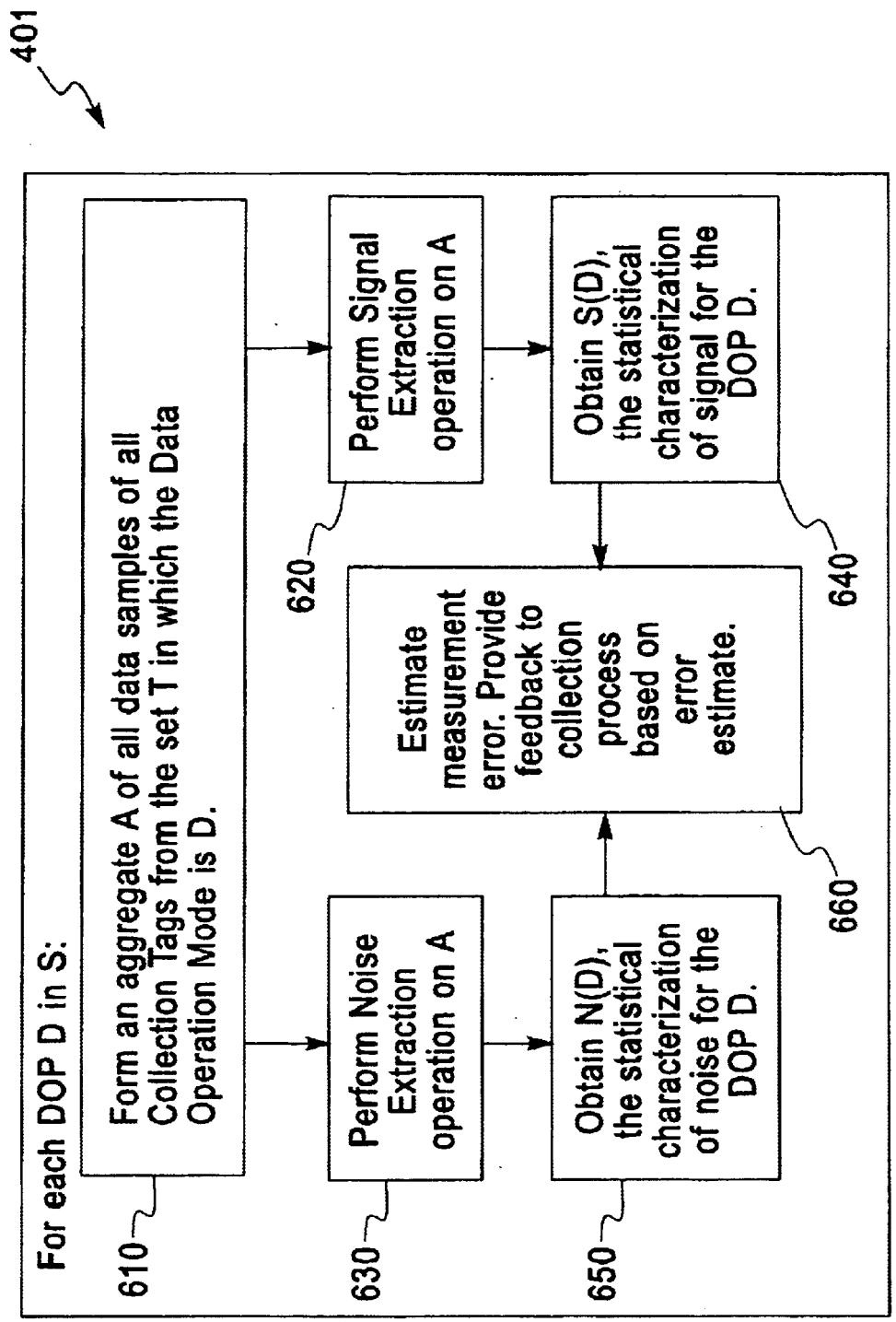
FIG. 6 is a flow chart of the Analysis process.

FIG. 6 is an example illustration of the method that may be used to determine relevant statistics. Denote by T the set of all collection tags for which message samples are collected. For each device operation mode D, an aggregate of message samples is prepared by combining message signals collected from different test equipment settings. Recall that for each execution of a function by the DUT, several signals may be collected and stored by the test equipment in step 311 of FIG. 3. That is, electromagnetic emanations from the DUT are acquired using various settings for collection equipment and then processed in various ways to give rise to derived signals. Thus this aggregate of derived signals may include a subset of all message signals from all relevant sensor outputs in all relevant test equipment settings. The relevance of sensor outputs and test equipment setting is determined in step 660 of FIG. 6 and it is fed back to the collection process as described above. In the preferred embodiment of this invention, the aggregate of message signals is either prepared by concatenating the signal together or by storing these signals in a multidimensional array. Therefore, in the preferred embodiment, the output of step 610 is N(D) aggregate message signals. It should be noted that due to different noise sources such as noise in test equipment, noise in the form of secondary DUT states etc., the aggregate message signals will contain noise.

Next in step 620 the message signal (also referred to as the signal component) is refined and extracted from N(D) aggregate message signals by a separator. For example, this can be done by averaging. Note that the process of extraction of the message signal may involve alignment of two or more message samples. The averaging employed for refinement includes a weighted averaging. The average message signal is then subtracted from each aggregate message signal to extract noise signal (also known as the noise component) in step 630. The subtraction used in this process includes a weighted subtraction. Next in step 640 and 650, the signal and noise components obtained for a setting of the collection equipment are aggregated to obtain a statistical characterization of signal and noise. This is also known as the aggregate signal signature and the aggregate noise signature, respectively. In the preferred embodiment, first order and second order statistical characterizations are performed and various correlations are computed. In particular, one can use average power level of the signal component and a spacing between the signal components to determine the aggregate signal structure. Similarly, one can use statistics such as a first order mean of the noise components, second order correlation of noise components to determine the aggregate noise structure.

Finally in step 660, a feedback for collection process is generated. This feedback takes into account the quality of message signals for different test equipment setting by using metrics such as signal-to-noise ratio, correlation coefficients etc. For example, if two different test equipment settings result in highly statistically correlated message and noise signals then the collection process may be directed to collect message signals for only one of the settings. Yet another example of feedback is when two different test equipment settings result in similar second order statistical properties, but different first order statistical properties of noise and message signal. In this case, the feedback may be to collect message signals only for test equipment settings that result in higher signal-to-noise ratios.

Figure 7:
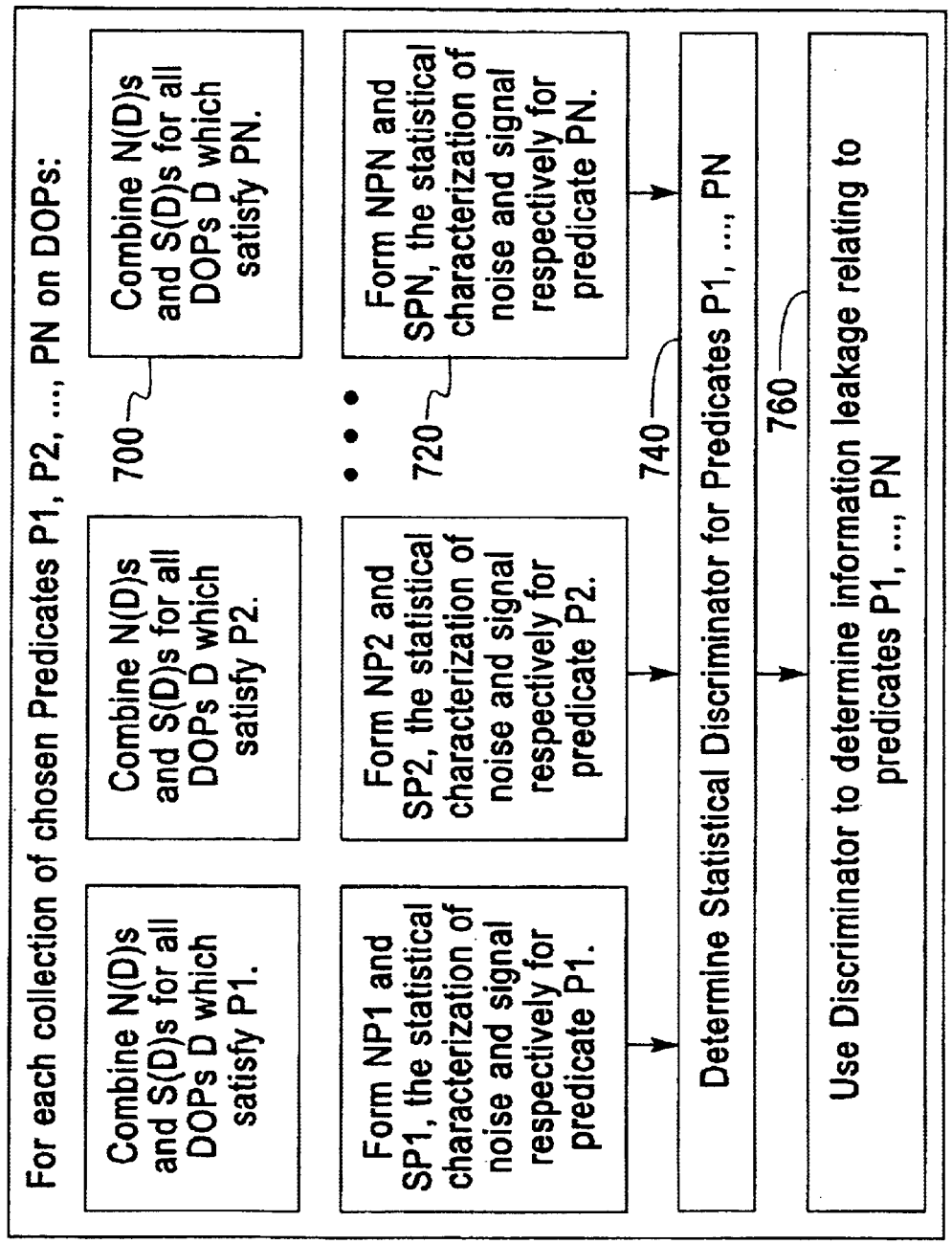
FIG. 7 is a flow diagram of an example embodiment for determining information leakage relating to predicates.

FIG. 7 shows a flow diagram of an example embodiment of a scoring device that uses a likelihood discriminator with one or more derived signals to compute a measure of confidence that one of the operations is being performed. These operations are characterized by predicates P1, . . . , PN. A predicate P is a property of a data operation mode DOP. For example, P1 may be satisfied if the least significant bit of the databus in a computer process is 1 and P2 may be satisfied if the least significant bit of the databus is 0. Yet another example of a predicate is when P1 is satisfied if the contents of a particular memory address have even Hamming weight. The scoring device computes a probabilistic measure of confidence for each of the predicates. These measures of confidence include estimated probabilities of predicates or a monotonic function of estimated probabilities of predicates. In order to compute the measure of confidence the scoring device uses a likelihood discriminator which may include a maximum likelihood discriminator.

In step 700 and 720, the scoring device combines statistical characteristics N(D) and S(D) for all DOPs which satisfy a given predicate. This results in N characterizations NP1, SP1, NP2, SP2, . . . , NPN, SPN respectively for predicate P1, P2, . . . , PN. There are several techniques for obtaining statistical characterizations for a predicate. For example, in the preferred embodiment of this invention, first and second order statistics for P1 is obtained by averaging first order and second order statistics of all DOPs that satisfy P1. The averaging process includes weighted averaging where weights are based on some measure of quality such as signal-to-noise ratio. In step 720, the scoring device may also compute a measure of vulnerability for one or more operations performed by the electronic device. This measure of vulnerability is based on information theoretic bounds derived from the statistical characterization NP1, SP1, NP2, SP2, . . . , NPN, SPN respectively of predicates P1, P2, . . . , PN. For example, the information theoretic bound may be a bound on the probability of making an error in deciding which operation was actually performed by DUT. This information theoretic bound may include a bound on the average entropy of the distribution on the predicates P1, P2, . . . , PN induced by the noise in derived signals.

Next in step 740, a statistical discriminator for predicates P1, P2, . . . , PN is determined. In the preferred embodiment the statistical discriminator is a likelihood ratio also referred to as a likelihood discriminator. This likelihood ratio may include an approximate maximum-likelihood ratio for each of the predicates as determined by a suitable computation procedure. To those skilled in the art, it is clear that several computation procedures can be employed to compute maximum-likelihood ratio including whitening realization, correlator realization, estimator-subtractor realization etc.

Note that in step 740, the scoring device may have access to more than one set of derived signals. In such cases, the scoring device would compute a cumulative score by combining measure of confidence derived from all sets of derived signals. For example, the cumulative score can be computed by optimal ratio combining method. In this method, the cumulative score is a weighted sum of confidence measures with the weight for a set of derived signals being an estimate of the quality of that signal set.

Finally, in step 760, information leakage relating to predicates P1, . . . , PN is determined. In the next step, a distance between statistical discriminator of different predicates conditioned on a given predicate P is computed. This distance measure can subsequently be used to determine information leakage in a more convenient form. For example, an embodiment may determine a probability of error (declaring predicate P1 to be true while actual hypothesis P2 occurred, etc.). This would constitute a measure of confidence of the predicate being satisfied. Another embodiment may determine information leakage in terms of number of bits of information calculated using probability of error.

The present invention describes techniques for practically eliminating exposures due to leakages from compromising emanations in security critical computing equipment. Using an evaluation methodology, such as the one described above and using the countermeasures described hereinafter, manufacturers will be able to redesign their systems to practically eliminate the exposures and develop workarounds to reduce the security exposures from the less serious leakages.

A description of software countermeasures in now presented below in FIGS. 8–10 which is provided as a description of related aspects of the invention.

Figure 8:
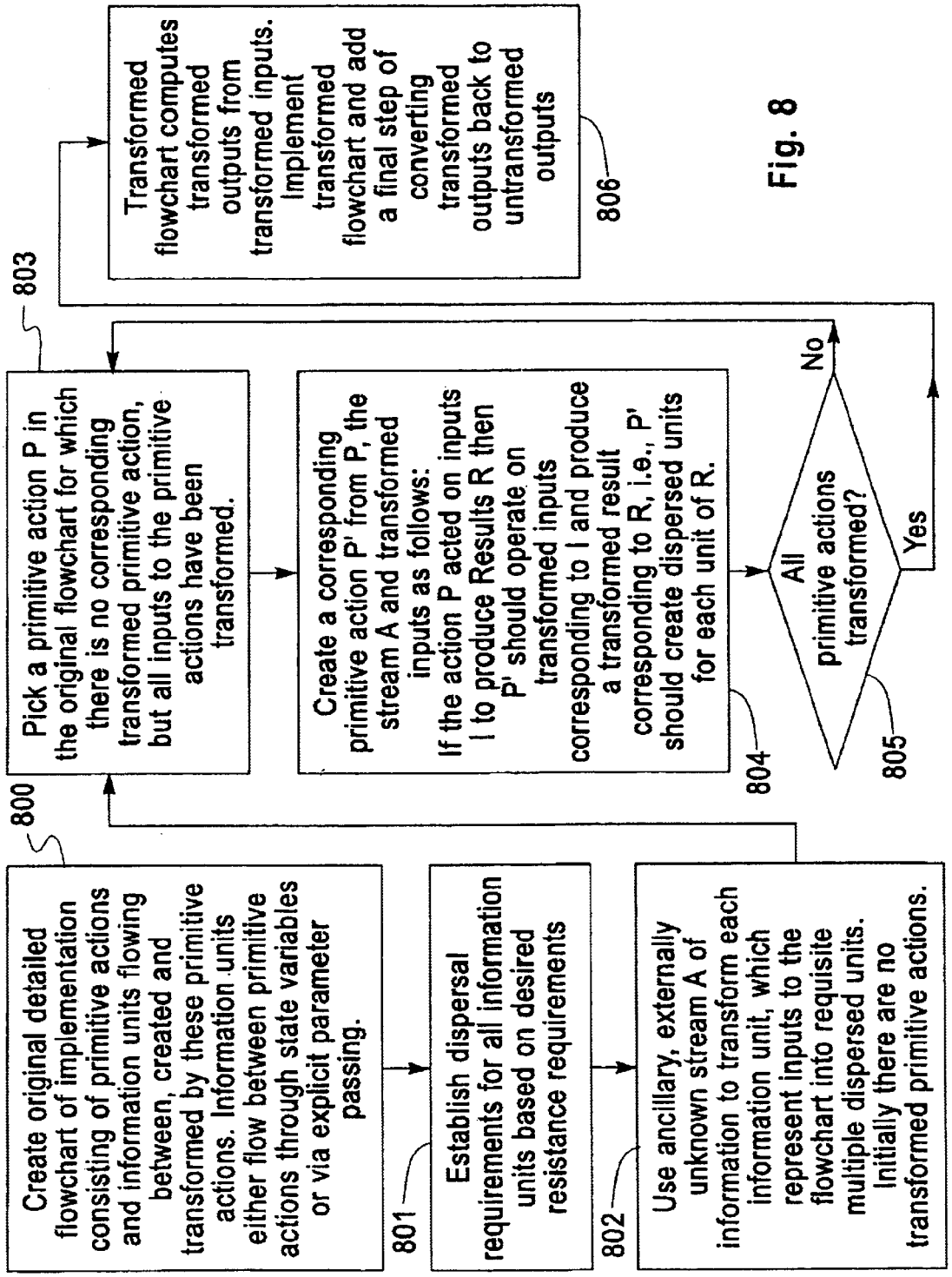
FIG. 8 is a flow chart of a mechanism to implement a given function with the desired level of resistance.

The mechanism to implement a given function with the desired level of resistance is further described in FIG. 8 in terms of a flowchart, which details an advantageous way of implementing the mechanism. A first step (800) is the creation of an original detailed flowchart, also known as the process flowchart, of the implementation of the function, without regard to resistance. Such a flowchart will comprise primitive actions (such as arithmetic operations, logical operations, etc.) and would detail the information units, also referred to as components, flowing between, created and transformed by these primitive actions. Some of these information units may be sensitive, in the sense that they carry security critical information. These information units could flow between various primitive actions in the form of state variables or the flow could be explicit, for example, via explicit passing of parameters. A subsequent step (801) is to establish the dispersal requirements for each of these information units based on the desired level of resistance. A process to incorporate this dispersal is initiated in next step (802), where an ancillary externally unknown stream A of information is used to transform information units corresponding to inputs into requisite multiple dispersed units. At this initial stage there are no primitive actions which have been transformed to deal with dispersed units. Subsequently, an iterative process is initiated (steps 803, 804, 805) which transforms all primitive actions. In each iteration, first a primitive action P in the original flowchart is chosen for which there is not yet a corresponding transformed primitive action, but all inputs to the primitive actions have been transformed (803). Then in step (804) a corresponding primitive action P' is created from P, the stream A and transformed inputs as follows: If the action P acted on inputs I to produce Results R then P' should operate on transformed inputs corresponding to I and produce a transformed result corresponding to R, i.e., P' should create dispersed units for each unit of R. Then in step (805) it is checked whether or not all primitive actions in the original flowchart have been transformed. If not, a new iteration is initiated from step 803. If all primitive actions have been transformed then step (806) is performed. In step (806), since all primitive actions have been transformed, a transformed flowchart is in place which starts with inputs, disperses them and then performs a sequence of transformed actions on dispersed information to produce dispersed information units corresponding to the output. This transformed flowchart is then directly implemented to create an implementation with the desired level of resistance, after adding a final step of converting the dispersed output back to the untransformed output.

Figure 9:
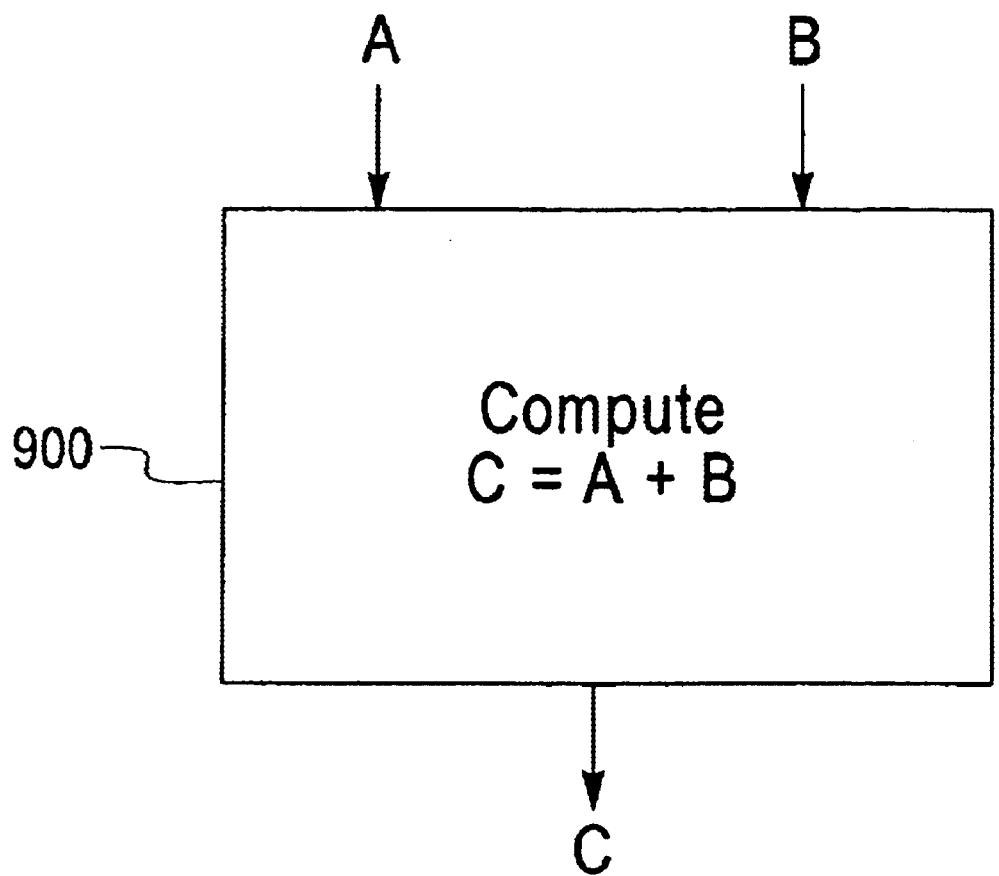
FIG. 9 is a compute function example.
Figure 10:
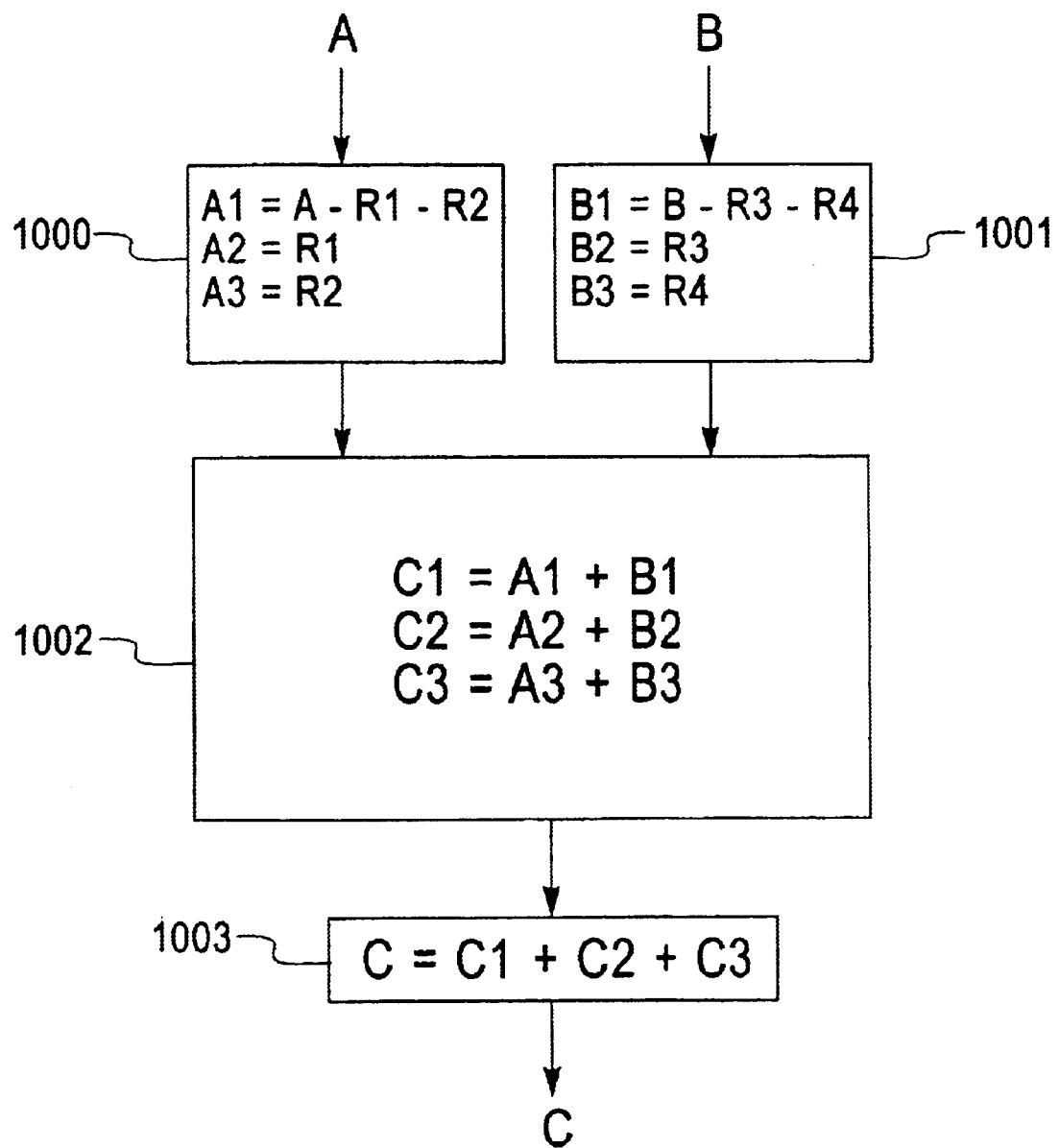
FIG. 10 is a further compute function example with a desired level of resistance.

FIGS. 9 and 10 show how the mechanism applies to a simple function which adds two integers A and B to get the result C. The original detailed flowchart of the function is given in FIG. 9, where there is one primitive action (900) which takes the two inputs A and B to compute the result C which is the sum of A and B. Suppose that for desired level of resistance it decided that each of the information units be dispersed into 3 units using a random stream of integers. The resulting transformed flowchart is depicted in FIG. 10. In this transformed flowchart, integer A is dispersed into three integral shares A1, A2 and A3 using random integers R1 and R2 from the random integer source (1000). Note that regardless of the value of A, any two shares from the set {A1, A2, A3} can take on any possible set of integral values and the three shares together sum up to A. A similar dispersal of B into shares B1, B2 and B3 using random integers R3 and R4 is performed in step (1001). Then in Step (1002) which corresponds to the primitive action in step (900) of the original flowchart, instead of computing C as the sum of A and B, one computes three integral shares of C, i.e., C1, C2 and C3 from the shares A1, A2 and A3 of A and shares B1, B2 and B3. The final step (1003) is to combine the shares of the output to produce the output, i.e., C is computed from C1, C2 and C3.

The process described above can also be applied to protect the leakage of compromising electromagnetic emanations from an electronic device by assuming the availability of (a) a definer that defined the process flow chart for the operation (b) a dispersal unit determinator that determines the number of information dispersal units for each of the components (c) a definer that for each of the components, defines a set of information dispersal units (d) a transformer that transforms one or more primitive actions into a transformed primitive action and (e) an output generator that reconstructs the output of the original primitive action from the outputs of the respective transformed primitive actions.

Next we describe methods and techniques for implementing software countermeasures that will permit the use of insecure devices in a reasonably secure manner. However, it is unlikely this will reduce the leakages altogether, so later we describe techniques that reduce the leakage of sensitive information by changing the construction of the device itself or its operating environment.

At this stage, the following are provided: (a) a leakage assessment of a device (b) a function to be performed by the device and (c) a desired level of resistance to some attacks that exploit the leakage of sensitive information via electromagnetic emanations when the device is performing the said function. The desired level of resistance is usually based on the total number of times the function can be performed on the device without leaking any sensitive information via the attack. The current invention provides a mechanism to implement the given function with the desired level of resistance. Clearly, the effectiveness of the techniques of the present invention to resist exposure via a wide variety of leakages will depend on the quality, correctness and comprehensiveness of the leakage assessment. For example, the earlier part of this disclosure discloses an advantageous method for performing such an assessment: other mechanisms may be followed for doing the same. In some cases, the level of resistance may be desired only against some of these leakages and in such a case, the leakage assessment of only these leakages is adequate.

From a design perspective, implementing a function on a device begins with an abstract decomposition of the function into constituent primitive actions in the form of a flowchart. As known to those with ordinary skill in the art, the flowchart specifies blocks of primitive actions and information flow between the blocks. The information flow between various blocks in the flowchart can sometimes be implicit, that is, it is carried within the state of the computation of the function, such as in program variables. In other cases, this information flow is explicit, that is, it is explicitly provided to the next primitive action, for example via parameter passing to a sub-function invocation.

The concrete realization of the function is based on the flowchart wherein the blocks of primitive actions are replaced by blocks of device specific primitive operations. In addition, the information flow is also rendered using additional blocks of device specific primitive operations. In a well designed implementation of a function, there is a clear relationship between the elements of the flowchart and elements of the concrete realization. Clearly, the leakage of the implementation of the function can be viewed as the aggregate leakage of the constituent blocks of primitive operations comprising the concrete realization. This in turn can be mapped into the leakages of each of the elements, that is the blocks of primitive actions and the information flow between the blocks, of the flowchart when implemented on the device.

Clearly, if the leakage associated with each element of the concrete realization can be arbitrarily minimized, then it should be evident to those with ordinary skill in the art, that any desired level of resistance against said attacks can be achieved. The present invention now discloses a method to arbitrarily reduce information leakage of any primitive action or information flow provided that there exists a concrete realization of the primitive action or information flow which does not leak the information fully, that is, given the leakage the attacker cannot determine with certainty what the information is by monitoring the available electromagnetic emanations. In fact, the invention discloses a systematic method that can derive a concrete realization of the primitive action with arbitrarily low information leakage from any concrete realization of the primitive action which leaks partial information. Clearly, those with ordinary skill in the art will realize that primitive actions can be performed in a multitude of ways using primitive operations some being more advantageous than others. So the choice of concrete realization upon which the disclosed method should be applied may involve considerations other than and in addition to the information leakage.

The systematic method is as follows. In addition to information flow specified in the flowchart, we assume that the device has access to an auxiliary and unrelated stream of information which is completely unknown to the attacker. In some advantageous embodiments, this auxiliary information stream is generated within the device by means of a random number generator. In other embodiments, this can be generated in a pseudo-random manner or by other techniques as known to those skilled in the art.

To address the application of the method to information flow, without loss of generality, it can be assumed that the information flow is comprised of units of information such as records, words, bytes etc. and there is a concrete realization of the information flow based on primitive operations that transfers these units from one block to another without leaking these units completely. The method uses the auxiliary information stream to transform the units of the original information flow into an alternative representation, hereinafter referred to as the dispersed representation, wherein each unit is represented as multiple dispersed units. The multiple dispersed units are derived from the original information unit and the auxiliary information stream in such a manner that the original information unit can be derived from the multiple dispersed units. One advantageous way of performing this dispersal is to use secret-sharing techniques to do this representation wherein a unit is represented as a collection of unit-sized shares and a minimum threshold of shares is required to completely reconstruct the original unit. Any combination of fewer shares than the threshold contain absolutely no information about the original unit. The method derives a new concrete realization in which the original information flow is replaced by a flow in which the original units are replaced by multiple dispersed units. Replacing the original units by the multiple dispersed units enjoys the mathematical advantage of having the ability to reduce the leakage of information about the original units to arbitrarily small values depending on the number of dispersed units in the transformed representation.

Similarly, the primitive operations of the concrete realization, which were operating on the original units of information, are now transformed so that they operate on the transformed representation consisting of multiple dispersed units resulting in output which itself is represented in multiple dispersed units of the original output. This too enjoys the same mathematical advantage.

The success of this method in creating an efficient and concrete realization that meets the desired level of resistance is dependent on judicious choice of the method of dispersal and choices made as to when to perform it. Those with ordinary skill in the art will recognize that this judicious choice is best exercised by linking the choice of dispersal to the primitive action being performed. In some advantageous embodiments therefore, the inputs to the original function would be dispersed in a manner suitable for processing by the initial blocks of primitive actions of the function yielding dispersed outputs. These dispersed outputs are then fed to the succeeding blocks of primitive actions until a point is reached wherein the method of dispersal is not suited for processing by the succeeding block. At such a point, it is conceivable that a new method of dispersal is elected to transform the information flow in another manner suitable for processing by the succeeding block.

A detailed description of the hardware countermeasures is now presented below in FIGS. 11–13.

The first step in the process is to reduce the leakage from the DUT itself by the use of shielding techniques described below. Leakage of information via electromagnetic emanations can be suppressed at different levels within the overall system. It is advantageous to suppress these signal emanations at the lowest possible level. Therefore IC/ASIC emanations can be reduced by carefully controlling the signals created within the IC/ASIC. For example, information leakage from modulated carrier signals can be minimized by a judicious choice of various characteristics of the clock signal. This includes choosing the shape of the clock signal which reduces or eliminates those harmonics which have been found to carry significant information leakage via modulation with some message signal. This differs from the current art in that the emphasis is not on reducing the energy radiated beyond a certain harmonic but rather on the information carried in different harmonics.

When internal IC/ASIC solutions are not possible, then filtering on the printed circuit board near the device pins will reduce unwanted signals on the various traces connecting to the IC/ASIC. The filtering bands are chosen to reduce or eliminate the regions of spectrum which have been found to carry significant information leakage. Local shielding around the device will reduce the direct emanations and should be used in addition to the local filtering when sensitive data is involved.

Overall system shielding and filtering based on knowledge of the regions of the spectrum found to permit significant information leakage can also used. In this case, little or no control of the IC/ASIC is possible, nor is local shielding and filtering possible. The system enclosure becomes the protection boundary and metal shielding is used around the system, and filtering of all the I/O lines is required to insure the unwanted signals are suppressed and will not cause emanations.

Emanations control can be accomplished within the actual IC/ASIC chip silicon die itself. The approach involves determining the circuits within the die that result in significant information leakage. Such circuits can be physically isolated from other circuits. As the silicon die is built up (layer by layer), the critical circuits are isolated by applying solid metalized planes on the layers above and below the critical circuits. This internal die shielding plane should be connected to the internal ground-reference for the IC/ASIC chip. If manufacturing processes do not allow solid layers of conducted material, then a crossed set of conducting wires can be used. The spacing between the wires should not exceed the width of the wires themselves.

A detailed description of the invention is now presented in FIGS. 11–13 below.

Figure 11:
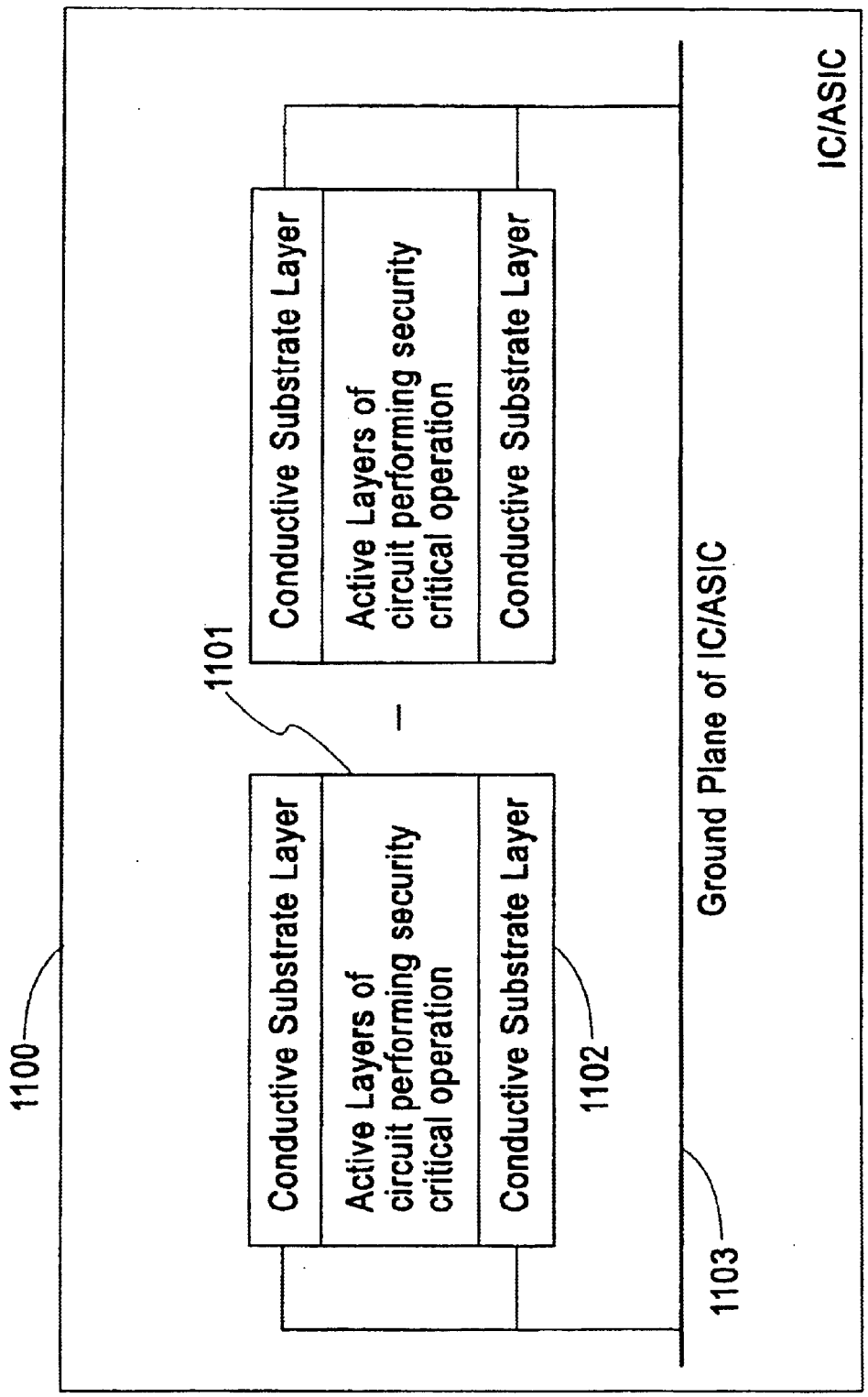
FIG. 11 is a block diagram of a circuit structure used for hardware countermeasures.

FIG. 11 depicts the structure of an IC/ASIC 1100 that has been constructed so as to minimize electromagnetic emanations when it is operating and performing its desired function. The first step in constructing such a device is to isolate the active layers of the circuitry 1101 that will potentially perform security critical operations. In the process, these layers may emit compromising electromagnetic emanations. In order to protect the IC/ASIC, these layers are then shielded either partially or completely both above and below by conductive substrate layers 1102. The conductive substrate layers may be manufactured from a metal (such as copper, silver, metallic mesh or gold) or may even be a conductive semi-conductor. These layers are then connected to the electrical ground plane 1103 of the IC/ASIC. Electromagnetic emanations from the active layers, which may contain compromising information, are shielded by the conductive substrate layers. Any currents induced in the layers are then discharged via the connection to the ground plane. As a consequence, emanations do not leave the IC/ASIC thereby thwarting the adversary.

Figure 12:
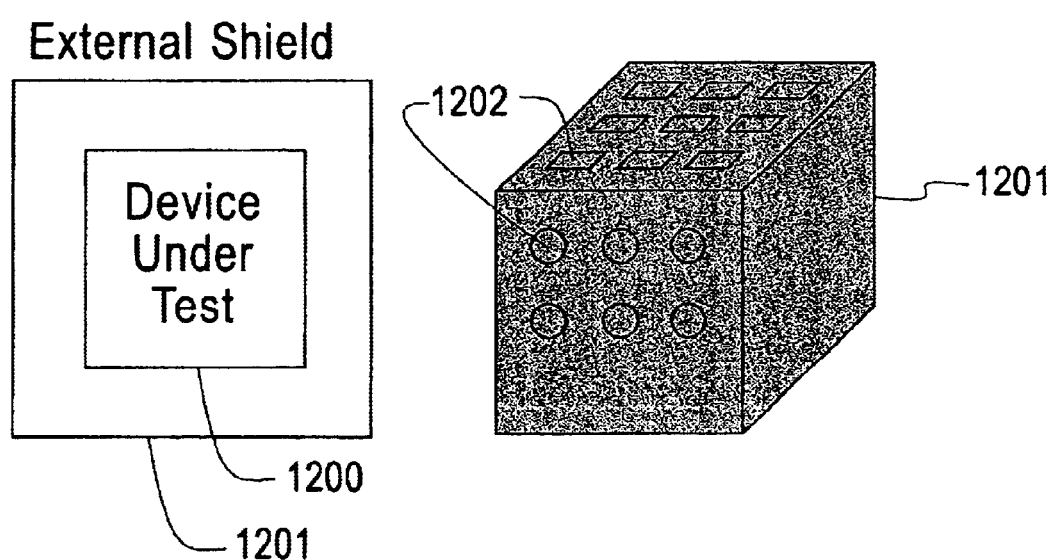
FIG. 12 is a block diagram of one example circuit structure embodiment used for hardware countermeasures that has a shielded enclosure.

FIG. 12 depicts a technique that can be used to protect a device under test 1200 from attacks based on its electromagnetic emanations. In such a situation, an external shield 1201 can be placed around the device. As shown in the figure, the shield would contain a number of apertures 1202. These apertures can be of different shapes (such as a slot, a circle, a mesh or a square etc.) and of different dimensions and are also known as frequency selective apertures. The shape and dimension of the apertures is usually determined by an analysis of the electromagnetic emanations and a decision as to which frequencies should be shielded and which should be allowed to pass through. In practice, the frequency range can be selected by the maximum dimension of the aperture.

Figure 13:
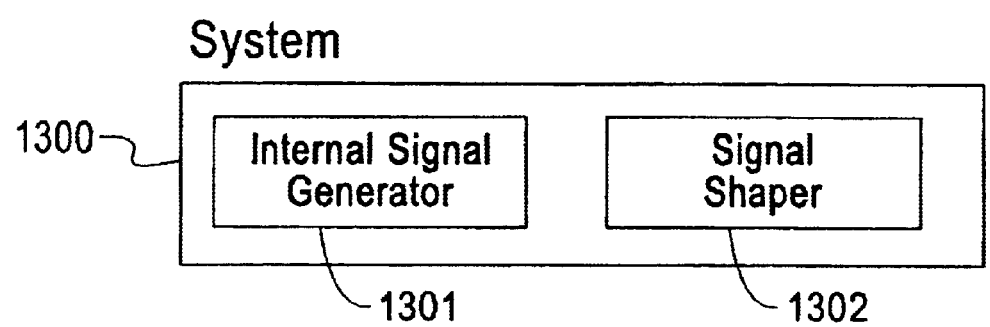
FIG. 13 is a circuit diagram of a signal shaper used in one example embodiment of the invention.

FIG. 13 depicts a system 1300 consisting of an internal signal generator, also referred to as a system internal signal source 1301. The internal signal generator may be a control signal, a data signal, or a clock signal. In addition, there is a signal shaper 1302, intended to distort the wave shape of the electromagnetic emanations due to the signals generated by the internal signal generator 1301. This can be accomplished by distorting the amplitude of one or more harmonics of the frequency (of the electromagnetic emanations) where the harmonics carry the sensitive information, or by distorting the frequency of the wave form itself, or by distorting a phase of the wave form. This is accomplished by the signal shaper 1302 generating a second electromagnetic emanation that distorts the emanation from the internal signal generator 1301.

We claim:

1. An integrated circuit device comprising:
   at least one active layer comprising at least one electronic component that emits electromagnetic emanations; and, a plurality of electrically conductive layers a first one of which is disposed above said at least one active layer and a second one of which is disposed beneath said at least one active layer for shielding the electromagnetic emanations emitted by said at least one electronic component to inhibit detection of sensitive information conveyed by the electromagnetic emanations at a location external to said integrated circuit device.

2. The integrated circuit device, as in claim 1, where where said plurality of electrically conductive layers disposed so as to cover only a portion of said at least one active layer that comprises said at least one electronic component.

3. The integrated circuit device, as in claim 1, where at least one of said plurality of electrically conductive layers comprise a metal.

4. The integrated circuit device, as in claim 3, where the metal is comprised of at least one of copper, silver, a metallic mesh, and gold.

5. The integrated circuit device, as in claim 1, where at least one of said plurality of electrically conductive layers is comprised of an electrically conductive semi-conductor material.

6. The integrated circuit device, as in claim 1, where the integrated circuit device further comprises an external shield.

7. The intergrated circuit device, as in claim 6, where the external shield has one or more frequency selective apertures.

8. The integrated circuit device, as in claim 7, where the apertures are any one or more of the following shapes: a slot, a circle, a mesh, and a square.

9. The integrated circuit device, as in claim 6, where a frequency range is selected by a dimension of the aperture.

10. The integrated circuit device, as in claim 1, further comprising:
    at least one system internal signal source that generates an internal signal with a wave form and a frequency; and
    a signal shaper that generates an emanation that distorts an emanation that results from the internal signal.

11. The integrated circuit device, as in claim 10, where the signal shaper distorts a wave shape of the wave form.

12. The integrated circuit device, as in claim 11, where the signal shaper distorts the wave shape of the wave form by distorting the amplitude of one or more harmonics of the frequency where the harmonics carry the sensitive information.

13. The integrated circuit device, as in claim 10, where the signal shaper distorts a frequency of the wave form.

14. The integrated circuit device, as in claim 10, where the signal shaper distorts a phase of the wave form.

15. The integrated circuit device, as in claim 10, where the internal signal source at least one of: a control signal, a data signal, and a clock signal.

16. The integrated circuit device, as in claim 1, where the electronic emanations are produced by operations performed by the integrated circuit device.

17. An integrated circuit device comprising:
    at least one system internal signal source that generates an internal signal characterized by a wave form and a frequency; and
    a signal shaper that generates a first electromagnetic emanation that distorts a second electromagnetic emanation that results from the internal signal to inhibit detection of sensitive information conveyed by the second electromagnetic emanation at a location external to said integrated circuit device.

18. The integrated circuit device, as in claim 17, where the signal shaper distorts a wave shape of the wave form.

19. The integrated circuit device, as in claim 18, where the signal shaper distorts the wave shape of the wave form by distorting the amplitude of one or more harmonics of the frequency where the harmonics carry the sensitive information.

20. The integrated circuit device, as in claim 17, where the signal shaper distorts a frequency of the wave form.

21. The integrated circuit device, as in claim 17, where the signal shaper distorts a phase of the wave form.

22. The integrated circuit device, as in claim 17, where the internal signal source is comprised of at least one of: control signal, a data signal, and a clock signal.

23. A method to reduce release of electromagnetic emanations from active components within an electronic device, the active components comprising at least one signal source for generating first electromagnetic emanations having at least one measurable transmission characteristic, the method comprising:

providing a signal shaper in the electronic device; and operating the signal shaper to generate second electromagnetic emanations that distort at least one transmission characteristic of the first electromagnetic emanations to inhibit detection of sensitive information conveyed by the first electromagnetic emanations at a location external to said electronic device.

24. The method as recited in claim 23, wherein the at least one transmission characteristic comprises at least one of: wave form, frequency, amplitude, phase, frequency harmonic, wave shape.

* * * * *